US012694089B2

(12) United States Patent　(10) Patent No.: US 12,694,089 B2
Isaiah et al.　(45) Date of Patent: Jul. 28, 2026

(54) AI-ASSISTED AUTHENTICATION USING SYNTHETIC MEDIA OBJECT PERMANENCE TESTS

(71) Applicant: nSure.ai Payment Assurance Ltd., Tel-Aviv (IL)

(72) Inventors: Ziv Isaiah, Tel-Aviv (IL); Neta Bresler, Ramat-HaSharon (IL)

(73) Assignee: nSure.ai Payment Assurance Ltd., Tel-Aviv (IL)

( * ) Notice: Subject to any disclaimer, the term of this patent is extended or adjusted under 35 U.S.C. 154(b) by 142 days.

(21) Appl. No.: 18/600,898

(22) Filed: Mar. 11, 2024

(65) Prior Publication Data

US 2025/0284789 A1　Sep. 11, 2025

(51) Int. Cl.
　*G06F 21/36*　(2013.01)
　*G06T 11/00*　(2006.01)
　*G06T 13/80*　(2011.01)
(52) U.S. Cl.
　CPC ............. *G06F 21/36* (2013.01); *G06T 11/00* (2013.01); *G06T 13/80* (2013.01); *G06T 2200/24* (2013.01); *G06T 2210/08* (2013.01)
(58) Field of Classification Search
　CPC .. G06F 21/36; G06F 2221/2133; G06T 11/00; G06T 13/80; G06T 2200/24; G06T 2210/08
See application file for complete search history.

(56) References Cited

U.S. PATENT DOCUMENTS

| | | | | |
|---|---|---|---|---|
| 12,411,929 | B2 * | 9/2025 | Chitragar | G06F 21/36 |
| 2012/0167204 | A1 * | 6/2012 | Akka | G06F 21/36 |
| | | | | 715/862 |
| 2017/0161477 | A1 * | 6/2017 | Liu | G06F 21/316 |
| 2017/0262623 | A1 * | 9/2017 | Plenderleith | G06F 21/36 |
| 2020/0272726 | A1 * | 8/2020 | Moe | G06F 21/46 |
| 2022/0261473 | A1 * | 8/2022 | Zhai | G06F 21/42 |
| 2022/0394058 | A1 * | 12/2022 | Meunier | H04L 63/1441 |
| 2025/0077634 | A1 * | 3/2025 | Knox | G06F 21/316 |
| 2025/0094556 | A1 * | 3/2025 | Sarvana | G06F 21/36 |
| 2025/0225217 | A1 * | 7/2025 | Gundavelli | G06F 21/31 |
| 2025/0225220 | A1 * | 7/2025 | Rezaee | G06F 21/316 |

* cited by examiner

*Primary Examiner* — Mohamed A. Wasel

(57)　　　ABSTRACT

A method for generating a verification process and controlling access to an online resource, comprising acquiring a sequence of synthetic media content items, generated using a generative trained model, that emulate, visually, a loss of visual contact with an object that is set in motion through at least part of an occluding object in a scene, forming instructions for verification by presenting at least some of the synthetic media content items of the sequence as an inquiry, receiving, at a computing device, an access request to an online resource from a user device, responsive to receiving the access request, providing the instructions for verification from the computing device to prompt a user action related to the at least some of the synthetic media content items and determining whether to allow access to the online resource based at least partly on the user action.

20 Claims, 3 Drawing Sheets

Figure 1:
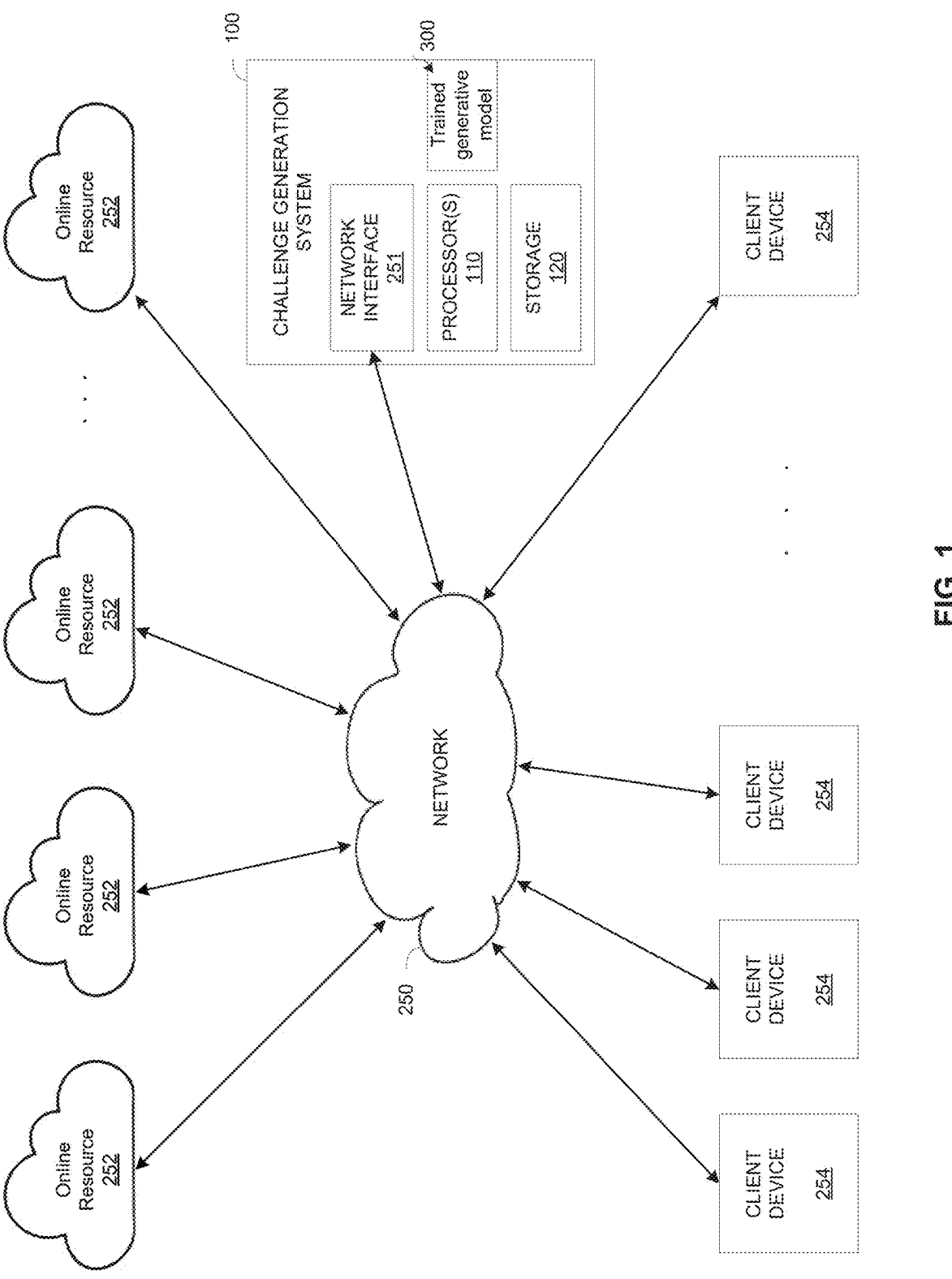

(a) Visible    (b) Occluded    (c) Contained    (d) Carried

Target is occluded

AI-ASSISTED AUTHENTICATION USING SYNTHETIC MEDIA OBJECT PERMANENCE TESTS

FIELD AND BACKGROUND OF THE INVENTION

The present invention, in some embodiments thereof, relates to access verification and authentication and, more particularly, but not exclusively, to ai-assisted verification and authentication using synthetic media object permanence tests.

Completely Automated Public Turing tests to tell Computers and Humans Apart (CAPTCHAs) are a standard security technique used by online services to distinguish human users from bots. Typical CAPTCHAs require the user to decipher distorted text images or select images that match a prompt. However, adversaries have developed automated solvers using computer vision and machine learning to defeat many CAPTCHA implementations. These defeats allow malicious bots to impersonate humans and gain unauthorized access to create fake accounts or scrape valuable data. At the same time, legitimate human users often find CAPTCHAs confusing and frustrating to solve correctly, hampering usability and accessibility. The static nature of CAPTCHA challenges also means that cyber attackers can analyze past samples and train machine learning models to automatically pass new tests without actually understanding the content. As the reliability of CAPTCHA technology decreases due to these weaknesses, online services need more robust bot mitigation solutions to prevent abuse, fraud, and data theft.

Emerging alternatives leverage implicit behavioural analysis and advanced artificial intelligence methods. For example, systems can monitor user movements during web sessions to detect non-human mouse trajectories and interaction patterns.

SUMMARY OF THE INVENTION

The present invention relates to a computer-implemented method and system for generating a verification process and controlling access to an online resource. The method involves acquiring a sequence of synthetic media content items, generated using a generative trained model, that emulate, visually, a loss of visual contact with an object that is set in motion through at least part of an occluding object in a scene. Instructions for verification are formed by presenting at least some of the synthetic media content items of the sequence as an inquiry. Upon receiving an access request to an online resource from a user device, the instructions for verification are provided to prompt a user action related to the presented synthetic media content items. Access to the online resource is determined based at least partly on the user action.

In some embodiments, the inquiry may be a request to mark the occluding object in at least one of the presented synthetic media content items, and the user action comprises a user selection of one of the presented synthetic media content items. In other embodiments, the inquiry may be a request to identify an order of the presented synthetic media content items, and the user action comprises a user action to reorder the presented synthetic media content items.

The method may further involve generating a plurality of substitutive synthetic media content items related to one target synthetic media content item from the sequence. The at least some of the synthetic media content items of the sequence are presented without the target synthetic media content item, and the instructions for verification include presenting the substitutive synthetic media content items as possible responses. The user action, in this case, comprises a user selection from among the substitutive synthetic media content items.

The sequence of synthetic media content items may comprise synthetic images, synthetic animations, or a combination thereof. The synthetic animations may be in the form of video files or Graphics Interchange Format (GIF) files. The object in the sequence may be set in motion through the occluding object to be contained by it or carried by it after passing through. The sequence may comprise between 4 and 8 synthetic media content items, with each item differing from another by a variance in color, background, lighting, or parameters of the object and occluding object while maintaining the overall composition and narrative of the scene.

The generative trained model used in the method may be trained by obtaining training media content comprising sequential images showing a loss of visual contact with another object moving through another occluding object and iteratively updating parameters of the model to increase accuracy in predicting subsequent frames matching the loss of visual contact. The trained model may comprise a sequence generation network for generating latent vector representations of sequential images and an image generation network for forming the sequence of synthetic media content by inputting the latent vector representations.

The system for implementing the method comprises one or more processors and a memory storing instructions that, when executed by the processors, cause the system to perform the steps of the method. A computer-implemented method for training the generative trained model is also provided, which involves obtaining training synthetic media content item data comprising sequential synthetic media content items that emulate a loss of visual contact with an object moving through an occluding object, training at least one generative trained model utilizing the training data to generate synthetic sequences, and storing parameters of the trained model for generating verification synthetic media content item sequences during runtime verification.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2A:
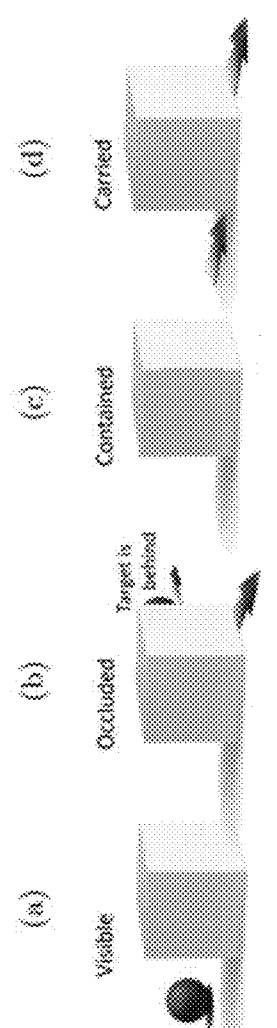
Figure 2B:
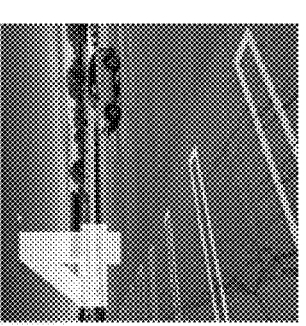
Figure 2B:
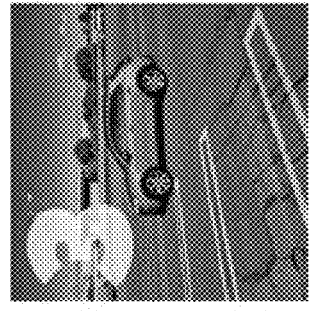
Figure 2B:
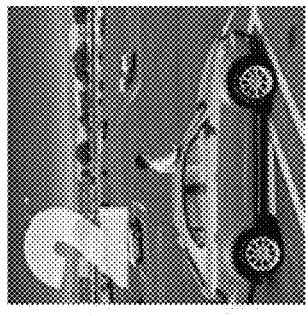
Figure 2B:
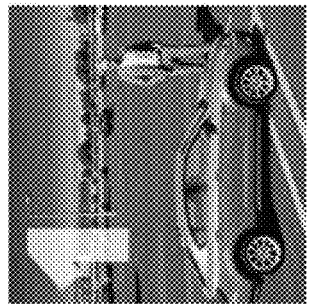
Figure 3:
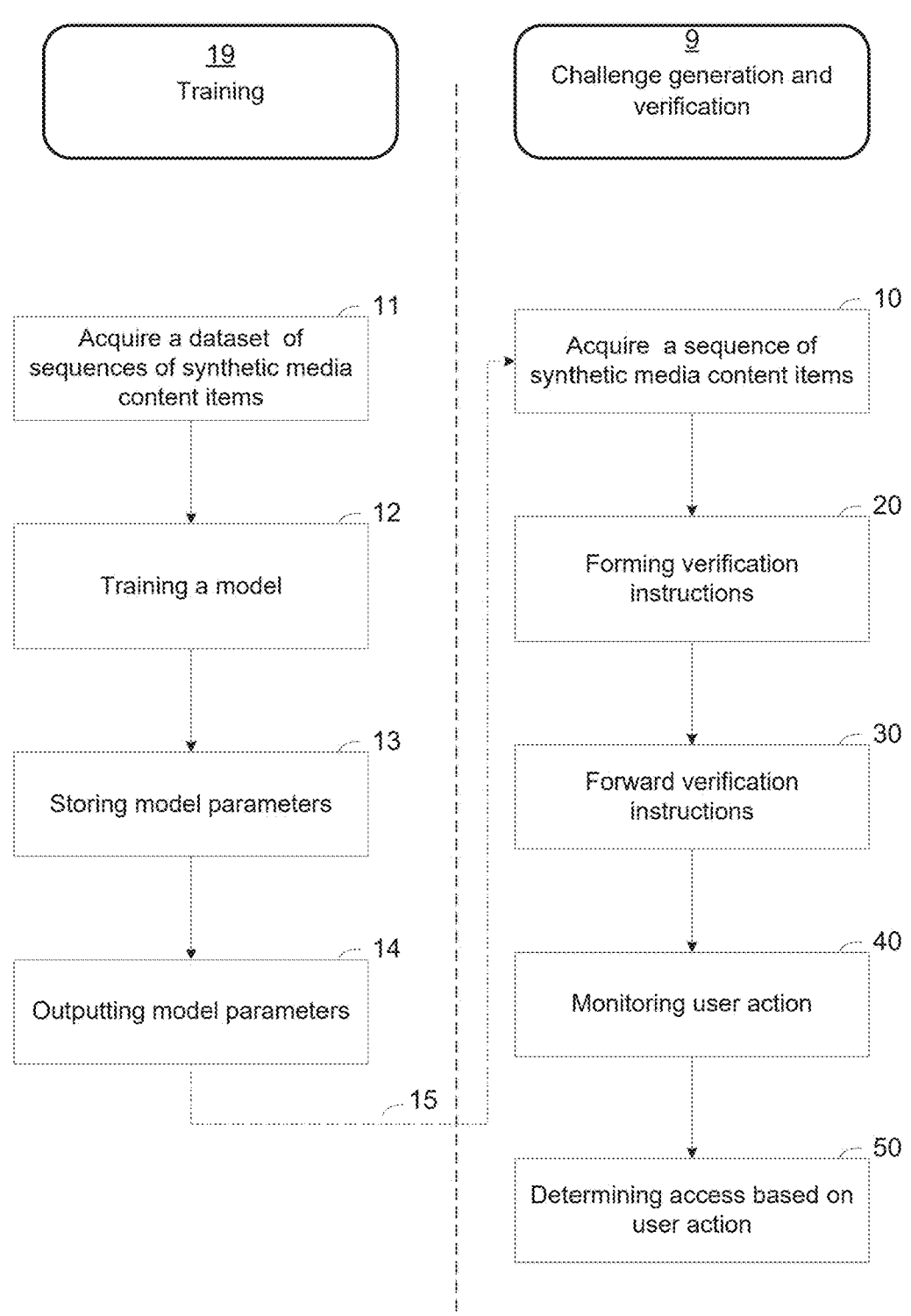

In the drawings:

FIG. 1 illustrates a challenge generation system for dynamically generating authentication challenges using synthetic media, according to some embodiments of the present invention;

FIGS. 2A-2B are exemplary sequences of images generated according to some embodiments of the present invention and depicting the occluding object moving with the object after the object is set in motion to be concealed by at least a portion of the occluding object; and FIG. 3 is a flowchart of a computer-implemented method for generating a verification process using the system depicted in FIG. 1 and a method which may be executed in parallel for training a model, according to some embodiments of the present invention.

DESCRIPTION OF SPECIFIC EMBODIMENTS OF THE INVENTION

The present invention, in some embodiments thereof, relates to access verification and authentication and, more particularly, but not exclusively, to ai-assisted verification and authentication using synthetic media object permanence tests.

The need for reliable human verification that thwarts increasingly sophisticated bots, without hampering usability, necessitates adopting these next-generation alternatives. Techniques that rely on implicit behaviours or dynamic synthetic media better handle the arms race against advancing AI attackers. At the same time, intuitive challenges based on innate human abilities avoid frustrating users. The background and motivation exist to develop such CAPTCHA alternatives to combat malicious bots threatening online services while still supporting legitimate human customers.

Some embodiments of the present invention disclose systems and methods for AI-powered identity verification using synthetic media and visual cognition challenges. A generative AI model such a generative neural network model may be specially trained to synthesize photo-realistic imagery sequences that emulate objects losing visual contact across occlusion(s). These dynamic synthetic media assets are used to automatically generate authentication prompts for distinguishing human users from bots attempting to improperly access online accounts and resources.

Specific visual reasoning faculties related to innate assumptions of object permanence, continuity, and physical interactions are evaluated for example by intentionally omitting key sequence items showing full occlusion. Users must leverage intrinsic mental reconstruction of intermediate obscured states based on immediately preceding and succeeding visibility. Decisions to allow or deny access are based on analysing logical human responses versus unreliable bot guesses.

The synthetic media verification approach confers multiple benefits over conventional CAPTCHA systems. Challenges are highly variable across users and sessions, optionally uniquely single time generated, preventing scripts or workarounds. Images are constructed algorithmically on-demand so simplicity of distortion is replaced by analysis of conceptual reasoning consistency. No preset databases exist for attackers to train automated solvers. Additionally, challenges rely on visual cognition faculties and physical intuitions that are inherent to human minds but remain difficult for AI. Avoiding text, puzzles, or 2D distortion lessens confusion and frustration for legitimate human users. Overall, the organic combination of latest AI synthesis with timeless principles of visual perception yields more usable, secure, and scalable bot detection capabilities to protect sensitive online assets like corporation undisclosed data, personal data, healthcare records, financial data, emails and personal profiles.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a challenge generation system 100, referred to herein as system 100, for dynamically generating authentication challenges using synthetic media, according to some embodiments of the present invention. The disclosed system 100 comprises one or more processors 110 and a memory 120 storing instructions to acquire a sequence of synthetic media content items 200 from a trained generative model 300, such as a generative AI, for instance a pre-trained neural network model. The sequence of synthetic media content items 200 is generated, optionally in response to a prompt, to visually emulate a loss of visual contact with an object moving through an occluding object in a scene.

The system 100 is optionally connected to a network 250 via a network interface 251. The system 100 may be implemented on existing cloud service and designed to provide verification services to verify identity of users requesting an access to existing online resources 252 from user devices 254. The prompt may include one or more changing variables to assure sequences with different visual parameters are generated. The varying visual parameters may include colors, sizes, type of objects, artistic styles, background, sceneries, narratives, and/or any other parameter that can be controlled using a prompt.

In use, when prompt, the generative trained model 300 forms verification instructions 400 to present an inquiry that comprises the sequence of synthetic media content items 200. Optionally the prompts are automatically created based on a predefined template or a set of instruction, for instance using a large language model (LLM) or Optionally, the generative trained model creates a synthetic media sequence emulating visual dynamics, either coherent or incoherent, of an object that travels into and through at least part of the occluding object on its path. The occlusion fully surrounds and contains the object for a period while visibility is blocked or partly conceal the object and reduces its visibility. Then, the object may emerge from the opposite side of the occluding object to regain visibility after crossing the obstruction or move together with the occluding object, for example when the occluding object is a vehicle as described below. This synthetic emulation of an object and/or the occluding object getting set in motion to not just go behind but be more fully encompassed by an occlusion enables stronger verification challenges. Requiring users to track the object when exterior views before and after offer less direct visibility sets a higher bar for innate reasoning about object permanence. Sometimes changes varying visual parameters as defined above set even a higher bar for innate reasoning about object permanence.

When the object trajectory leads it to be more fully enveloped and contained within the boundaries of the occluding object or even different from a trajectory of the movement of the occluding object that moves with or without the object, extrapolation of its intermediary state behind the obstruction becomes more difficult. This amplified test therefore better discriminates the reasoning capacity differences between humans and bots attempting to illegally bypass verification systems.

For example, responsive to an access request to an online resource 252, the verification instructions are provided to a user device 254 to prompt a user action related to the inquiry images. Access is allowed based in part on the user action correctly interacting with the sequence.

By leveraging the sequence of synthetic media content items which dynamically constructed to emulate physical events, the verification process provides intuitive human verification while thwarting automated software. The system 100 harnesses visual cognition to offer security advantages over conventional CAPTCHA technology in distinguishing legitimate users from bots attempting unauthorized access. The synthetic sequence verification improves realism, variability and accessibility compared to legacy human confirmation techniques.

The synthetic containment of the moving object purposefully heightens the challenge for more reliable confirmation of legitimate human users requesting access to sensitive online resources. Artificial intelligence currently seems to fall short of matching innate human faculties in making such visual-spatial inferences implicitly.

In one example, once the object passes fully behind the occlusion, the obstruction may be depicted shifting position across the scene with the object still inside, visually inaccessible to the user. This simulates the object being grabbed or held unseen by the occluding object as it transits, for instance as if it is in a vehicle. Eventually, the occluding container may release the object back into view at a new location consistent with the carrying motion. This serves as an amplified test of object permanence reasoning. Even when the occluding object appears to manipulate the concealed object to distant areas briefly before revealing it again, the human mind innately realizes it is the same persistent entity. Emulating active carrying of the hidden object by occluding objects that dominate the interim concealment period constructs more extensive object permanence challenges. The added complexity probes sophisticated facets of innate human visual continuity assumptions to further confirm authentic users and thwart artificial impersonation for secured access control.

The sequence of synthetic media content items acquired and used for verification may comprise synthetic still images or synthetic animations depicting the emulated object motions and occlusions. In the case of synthetic animations, the file formats may include video files or GIF files showing section of a flow wherein the object navigating into, behind, and back out from behind the occluding obstruction. The smooth movement visibility transitions that are characteristic of video and GIFs may provide greater realism and accuracy in modelling real world object permanence. Optionally, a sequence of still synthetic images is used for effectively convey the changing concealment and exposure of the traveling object across static snapshots. A presentation of key occlusion phases may sufficiently indicate continuity of position and appearance changes over time. The use of synthetic images also reduces data bandwidth and prompting speeds. Both synthetic multi-frame animations and synthetic stationary images, generated appropriately to capture degrees of visual occlusion, can support forming effective user verification challenges based on innate object permanence reasoning. The system 100 and methods can leverage either or both categories of synthetic media in tandem to enable flexible and adaptive verification processes using trained AI generative models.

Optionally, the sequence includes at least 3 distinct items that allows capturing the key stages of the object initially prior to the occlusion, transitioning behind the obstruction at timepoint 2, fully hidden within the occlusion at timepoint 3, and lastly re-emerging from the opposite side of the occluding object at timepoint 4. This conveys the essential phases for users to comprehend the continuity.

Optionally, no more than 8 items are in the presented sequence to prevent overly lengthy or redundant sequences that diminish verification speed and convenience for users. Around 8 items permit adding further frames with the object partially masked at occlusion boundaries to better observe the visual transform across the transition.

FIGS. 2A-2B are exemplary sequences of images generated according to some embodiments of the present invention and depicting the occluding object moving with the object after the object is set in motion to be concealed by at least a portion of the occluding object. For example, a Script for example Four-Image Sequence depicted in FIG. 2B is provided herein:

Image 1: Man Standing Next to the Car

Scene: A spacious parking lot with various parked cars. A green car is parked prominently in the foreground.

Main Object: A man standing next to the driver's side of the green car, key in hand, as if he's about to unlock it.

Container Object: The green car.

Artistic Style: Realistic Digital Art, showcasing a clear and lifelike depiction of the man and the car.

Narrative: Establishes the setting and introduces the main character and object (the man and the green car).

Image 2: Man Entering the Car Scene: Same parking lot, with a focus on the green car. The door of the car is open.

Main Object: The man is in the motion of getting into the car, with one leg inside the car and the other still outside.

Container Object: The green car, with its door open.

Artistic Style: Oil Painting, emphasizing the dynamic movement of the man entering the car.

Narrative: Shows the progression of the man's interaction with the car, adding a sense of motion.

Image 3: Car Driving Away

Scene: The parking lot with a wider view, showing the green car in motion, driving away from its original spot.

Main Object: The green car, now in motion.

Container Object: Not applicable as the focus shifts to the car in motion.

Artistic Style: Abstract Art, capturing the motion and dynamism of the car moving.

Narrative: Depicts the action of the car being driven, adding energy and progression to the sequence.

Image 4: Car Parked in a New Location

Scene: The parking lot, now showing the green car parked in the opposite corner from its starting position.

Main Object: The green car, now parked and stationary.

Container Object: Not applicable as the focus is on the stationary car.

Artistic Style: Black and White Sketch, simplifying the scene to focus on the final position of the car.

Narrative: Concludes the sequence with the car settled in a new location, suggesting a completed journey.

Optionally, the generative trained model (20) is developed using the synthetic media training data and comprises generative adversarial network model(s) (GAN). The model(s) have been pre-trained on vast diverse text and image datasets. Optionally, the pre-trained neural networks are fine tuned on specialized synthetic visual occlusion data adapts the models to internalize representations and patterns characteristic of objects losing and optionally regaining visual contact across obstructions. This focuses latent knowledge toward realistic generation of similar synthetic media sequences that appear authentic to the human eye. For example, the GANs may be fine-tuned using text captions describing pre-rendered imagery or videos demonstrating the visual dynamics of object occlusions. This imprints the sequence patterns and physical interactions to synthesize new novel samples from scratch during verification process requests. The pre-trained capacity for natural language semantics and visual conceptualization allows GANs to learn robust mental models of occlusion events. Text and image data align latent variables to encode the essence of visual continuity. Generative recreation then becomes possible by sampling intermediate synthetic points along the learned manifold trajectories.

Reference is also made to FIG. 3 which is a flowchart of a computer-implemented method 9 for generating a verification process using the system 100 depicted in FIG. 1 and a method 19 which may be executed in parallel for training the model used by the system 100, according to some embodiments of the present invention. Optionally, each of the verification processes created using the method 9 is generated only once, to prevent scripts or workarounds to automate responding the verification process. This maybe maintained by injecting a random or pseudorandom factor into the inference process.

Method 9 outlines a core procedure for leveraging AI-generated synthetic media assets to improve online resource access control. By evaluating user reactions to physical plausibility prompts only solvable via human cognition, bots can be better deterred without impacting usability.

As shown at 10, the method 9 starts when a sequence of synthetic media content items generated using the trained generative model 300 is obtained. The outputs of the model emulate visual dynamics of objects losing visual contact by an occlusion over time as described above.

Now, as shown at 20, the method 9 forms verification instructions by selecting portions of the sequence before and after the occlusion to create an inquiry. As shown at 30, these instructions are forwarded to present an inquiry upon receiving an access request to a protected online resource from a user device.

Now, responsive to the access request, as shown at 40, user actions provided in respond to the presentation of the inquiry are monitored. For example, after monitoring a user action made in response to the presented inquiry, for instance a selection of a media content item out of multiple substitutes or ordering media content items, as exemplified below, an indication of the answer to the inquiry is sent to the system, for example to the network interface 251 of the system 100, to allow determining whether the selection is matched with a target synthetic media content depicting full occlusion.

Finally, as shown at 50, it is determined whether to allow or deny access to the requested online resource based at least partly on the user response to the synthetic sequence in the inquiry. An appropriate logical response consistent with innate object permanence reasoning permits access, whereas unreasonable responses suggest automated software is attempting verification. For example, when the user chose incorrectly, not selecting a suitable substitutive item that belongs as part of the sequential physics emulation or not perform the right ordering action, access is automatically denied to the requested online resource. A negative indication is returned denoting the user failed the object permanence challenge.

Only when confirmation is received that the substitutive selection precisely matched the pivotal target synthetic content, demonstrating comprehension of the object's intermediary obscured appearance, will access to the protected account or system be permitted.

This mechanism enforces stricter security by requiring visual confirmation of the object's true momentary occlusion, rather than just generally logically consistent behaviour along its visibility transitions. Verifying explicit precision regarding the most obscured period builds further trust in the user's humanity before granting online access.

In one implementation, the processors 110 of the system 100 executes instructions to generate verification processes for controlling access to online resources by multiple different users. The processors 110 of the system 100 acquire sequences of synthetic media content generated using the trained model 300 and emulating a loss of visual contact with moving objects. Verification instructions presenting at least a portion of each of the sequences as inquiries are provided to user devices 254, for instance via the network interfaces 251, prompting user actions. Access to resources is allowed based on the user response to the synthetic media prompts.

Specifically, the trained model 300 produces synthetic content depicting objects moving behind occlusions in a scene as described above. By prompting users to make an action that add reason about the missing sections, bots without innate reasoning can be deterred from gaining unauthorized access. The system evaluates user responses by inherent mental faculties rather than difficulty of static distortion images. Further, the variable sequences prevent scripts and workarounds unlike predefined tests. This combination of synthetic content cognition and unpredictability enables robust bot mitigation and huma verification to protect online resources.

As stated previously, forming the verification instruction may involve presenting portions of the acquired synthetic media sequence, showing phases of the object moving across the occluding object, but intentionally omitting the target item that reveals the object fully obscured within the occlusion. By providing the content items showing the object directly before and after the concealed period, while excluding the intermediate target item, users must logically determine the missing object's appearance based solely on its earlier and later observable states. This selective exclusion constructs an object permanence challenge relying on human cognition. The inquiry probes users' intuitive comprehension that objects continuously exist, even when temporary visual obstructions occur. This innate reasoning faculty allows people to accurately infer properties of obscured things based on limited partial views combined with innate permanence assumptions. The synthetic media sequence with the target full-occlusion item omitted purposefully creates this object permanence test for discrimination between human and artificial intelligence. Bots currently cannot duplicate such implicit reasoning faculties grounded in innate real-world physical expectations. As a result, the challenge format reliably verifies legitimate human users for access control while thwarting automated software impersonation.

In some implementations, the authentication system 100 functions as a stand-alone verification service for third-party online resources 252. Via an API or other integration, a resource manager can request a synthetic media sequence to use in confirming user access to accounts on its platform. The system 100 leverages its generative model 300 to create new occluded object sequences on demand per requests from affiliated online services. The sequence and optionally associated authentication instructions are provided to the requesting resource manager for presentation to its users accessing their accounts or data. User responses to the supplied synthetic verification challenges are relayed back to the system 100 for evaluating the results to allow or deny access granted through the external resource. This authentication or verification sequence delivery service allows online platforms to outsource dynamic security CAPTCHA processes to the specialized system 100 and gain significant improvements in bot detection over conventional methods. The system 100 grants the resource owner 300 real-time control to customize challenge parameters and difficulty balancing usability and security needs, all handled via accessed cloud interfaces.

By offering synthetic sequence generation and authentication or verification or verification analysis as a stand-alone service, online domains 252 can confirm user humanity rapidly without large infrastructure investments. The system 100 provides the advancing AI verification techniques to guard accounts on arbitrary platforms against increasingly sophisticated bots and malicious access.

In other implantations the system 100 maybe an internal service or software module of a system that manages access to online resources.

Reference is now made to method 19. It should be noted that method 9 may be implemented without method 19, for instance using a generative neural network which is trained independently from method 9 or system 100 or independently therefrom, for instance without obtaining any data from the execution of method 9 or from system 100. As shown in FIG. 3, a dataset comprising multiple items that emulate a loss of visual contact with a moving object through an occlusion as acquired, optionally labeled, is obtained 11. Each verification sequence comprises at least some synthetic items from the full synthetic sequence emulating transitional object visibility loss and subsequent exposure from the occlusion. This allows labeling content items that focus on pivotal moments just before, at, and after full concealment. Then, as shown at 12, generative model(s) are trained utilizing the training data, to generate synthetic sequences portraying the visual occlusion dynamics. The model learns manifold representations and transformations to synthesize photorealistic imagery. Now as shown at 13, parameters of the trained generative model(s) are stored for generating instructions to produce verification synthetic media content sequences during runtime authentication or verification or verification prompting. This allows outputting the model 14, for instance for usage of the system 100. As shown at 15, outputs of the model may be used for providing the sequence of synthetic media content items generated using the trained generative model and acquired by the processor in 10. The outputs of the model emulate visual dynamics of objects losing visual contact by an occlusion over time as described above.

Reference is now made to examples of possible inquiries which are generated using the above-described sequence of synthetic media content items.

In some embodiments of the present invention, this inquiry is a request for the user to explicitly mark the occluding object in at least one of the presented content items from the sequence. For example, the user may be prompted to click on an image, a GIF or a video depicting an obstruction that briefly conceals a moving object over the course of the sequence emulating visual occlusion physics. This focuses user attention and reasoning precisely where the object permanence determinations are most relevant. The sequence may demonstrate the object at various stages of visibility transitioning into and out of the occlusion. Selecting the specific item that logically has the object hidden behind the marked occluding object tests innate human visual continuity reasoning. By directing users both to identify occluding object location and choose the specific point of obscured object permanence, the verification system may robustly confirm human cognitive capabilities. This dual synthetic content interaction provides substantial bot mitigation to protect online resources from automated software impersonation.

In some embodiments of the present invention, forming the verification instructions involves creating an inquiry prompting users to identify a correct sequential order of presented synthetic media content items. Specifically, portions of the sequence showing stages of the object moving behind the occluding object are intentionally shuffled into an incorrect random order. The user is asked to properly reorder the items to restore chronological visual continuity of the object translating across the obscuration.

Correspondingly, monitoring the user action comprises detecting interactions to reorder the mixed-up content items into their original proper progression. Humans can logically reconstruct the accurate sequence based on innate comprehension of persistent object motion and visibility.

In contrast, current AI systems cannot reliably duplicate this cognitive sequencing task based only on the visualized appearances and events. By prompting users to reorder subsets of synthetic occluded movement, bots can be more effectively deterred from accessing protected online resources. The necessity and selectivity of sequencing items depending on occlusions significantly hardens the verification test over conventional.

In some embodiments of the present invention, the method further involves using the system 100 for generating a plurality of substitutive synthetic media content items related to one target item from the originally acquired sequence.

For example, the target item depicts the object at the specific stage where visual contact is fully obstructed by the occluding element. The substitutes present plausible alternative appearances of the hidden object, though only one correctly shows what is behind the occluding object based on the actual sequence physics. By only showing before and after the concealment, users must determine the intervening appearance behind the occluding object. This leverages innate human reasoning regarding continuity of objects even when visibility is temporarily impeded.

Forming the verification instructions involves displaying inquiry images showing portions of the sequence except the target item. The substitutes are presented alongside as possible responses. The user is asked to pick the one substitute properly depicting the object fully occluded by the obstructor. As part of monitoring the user action, the method detects which substitute content item was selected by the user. Humans can logically deduce the accurate appearance despite only seeing the object directly before and after concealment by the occluding object. This leverages innate reasoning of object permanence.

In contrast, AI systems struggle to perform such visual and physical extrapolation believably. By prompting synthetic substitute selection while withholding vital sequence sections, bots are more likely fooled while human access is preserved.

It is expected that during the life of a patent maturing from this application many relevant files will be developed and the scope of the term synthetic media content items is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchange-ably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer-implemented method for generating a verification process and controlling access to an online resource, comprising:

acquiring a sequence of synthetic media content items, generated using a generative trained model, that emulate, visually, a loss of visual contact with an object that is set in motion through at least part of an occluding object in a scene, by presenting successive temporal frames depicting said object becoming fully occluded by said occluding object and remaining hidden while motion continues;

forming instructions for verification by presenting at least some of the synthetic media content items of the sequence as an inquiry;

receiving, at a computing device, an access request to an online resource from a user device;

responsive to receiving the access request, providing the instructions for verification from the computing device to prompt a user action related to the at least some of the synthetic media content items; and determining whether to allow access to the online resource based at least partly on the user action.

2. The method of claim 1, wherein the inquiry is a request to mark the occluding object in at least one of the presented synthetic media content items wherein the user action comprises a user selection of one of the presented synthetic media content items.

3. The method of claim 1, wherein the inquiry is a request to identify an order of the presented synthetic media content items; wherein the user action comprises a user action to reorder the presented synthetic media content items.

4. The method of claim 1, further comprising generating a plurality of substitutive synthetic media content items related to one target synthetic media content item from the sequence; wherein the at least some of the synthetic media content items of the sequence are presented without the target synthetic media content item; wherein forming instructions for verification comprises presenting the substitutive synthetic media content items as possible responses; wherein the user action comprises a user selection from among the substitutive synthetic media content items.

5. The method of claim 4, wherein presenting the substitutive synthetic media content items as possible responses includes presenting the target synthetic media content item as one of the answers to the inquiry.

6. The method of claim 1, wherein the sequence of synthetic media content items comprises at least one of a plurality of synthetic images and a plurality of synthetic animations.

7. The method of claim 3, wherein the plurality of synthetic animations are selected from a group consisting of video files and Graphics Interchange Format (GIF) files.

8. The method of claim 4, wherein the sequence without the target synthetic media content item forms an object permanence test.

9. The method of claim 1, wherein the object is set in motion through the at least part of the occluding object to be contained by the occluding object.

10. The method of claim 1, wherein the sequence of synthetic media content items emulates carrying of the object by the occluding object after the object is set in motion through the at least part of the occluding object.

11. The method of claim 1, wherein the sequence of synthetic media content items comprises between 4 and 8 synthetic media content items.

12. The method of claim 1, wherein each one of the sequence of synthetic media content items is different in relation to another of the sequence of synthetic media content items by a variance in at least one of color, background, lighting, a parameter of the object, and a parameter of the occluding object while an overall composition and narrative of the scene is maintained.

13. The method of claim 1, further comprising: training the generative trained model by obtaining training media content comprising sequential images showing a loss of visual contact with another object moving through another occluding object; and iteratively updating parameters of the generative trained model to increase accuracy in predicting subsequent frames matching the loss of visual contact; wherein determining whether to allow access further comprises: transmitting an indication of whether the user selection matched the target synthetic media content; and denying access to the online resource responsive to receiving an indication that the user selection did not match the target synthetic media content.

14. The method of claim 1, wherein the object is selected from the group consisting of: a moving cartoon character, a moving computer-generated character, a moving geometric shape, and a moving depiction of an animal.

15. The method of claim 1, further comprising: receiving information associating the user with a user account on the computing device; wherein determining whether to allow access further considers an authorization level of the user account.

16. The method of claim 1, wherein acquiring the sequence of synthetic media content further comprises:

generating variability between individual synthetic media content items in the sequence by applying noise functions and distortions.

17. The method of claim 1, wherein the generative trained model comprises a sequence generation network and an image generation network, the method further comprising: generating latent vector representations of sequential images using the sequence generation network; and forming the sequence of synthetic media content by inputting the latent vector representations into the image generation network.

18. The method of claim 1, further comprising automatically generating a query and using a large language model and inputting the query into the generative trained model for creating the sequence of synthetic media content items.

19. A system for generating a verification process and controlling access to an online resource, comprising:
   one or more processors; and
   a memory storing instructions that, when executed by the one or more processors, cause the system to:
      acquire a sequence of synthetic media content, generated by a generative trained model, visually emulating a loss of visual contact with an object moving through an occluding object in a scene, by presenting successive temporal frames depicting said object becoming fully occluded by said occluding object and remaining hidden while motion continues;
      form verification instructions to present at least some of the members of the sequence as an inquiry;
      receive an access request to an online resource from a user device;
      responsive to receiving the access request, provide the verification instructions to prompt a user action related to the at least some of the members of the sequence; and
      determine whether to allow access to the online resource based at least partly on the user action.

20. A computer-implemented method for training a generative trained model for a verification process, comprising:
   obtaining training synthetic media content item data comprising sequential synthetic media content items that emulate a loss of visual contact with an object that is moving through an occluding object, by presenting successive temporal frames depicting said object becoming fully occluded by said occluding object and remaining hidden while motion continues;
   training at least one generative trained model, utilizing the training synthetic media content item data, to generate synthetic sequence of synthetic media content items that emulate the loss of visual contact; and
   storing parameters of the at least one trained generative trained model for generating instructions to generate a verification synthetic media content item sequence during runtime verification;
   wherein the verification synthetic media content item sequence comprises at least some of the synthetic sequence of synthetic media content items.

* * * * *